United States Patent
Nozue et al.

(10) Patent No.: US 11,367,308 B2
(45) Date of Patent: Jun. 21, 2022

(54) COMPARISON DEVICE AND COMPARISON METHOD

(71) Applicant: PANASONIC INTELLECTUAL PROPERTY MANAGEMENT CO., LTD., Osaka (JP)

(72) Inventors: Yosuke Nozue, Kanagawa (JP); Kazuki Maeno, Kanagawa (JP); Hiroaki Yoshio, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 642 days.

(21) Appl. No.: 16/306,198

(22) PCT Filed: May 29, 2017

(86) PCT No.: PCT/JP2017/019865
§ 371 (c)(1),
(2) Date: Nov. 30, 2018

(87) PCT Pub. No.: WO2017/212967
PCT Pub. Date: Dec. 14, 2017

(65) Prior Publication Data
US 2021/0224521 A1    Jul. 22, 2021

(30) Foreign Application Priority Data
Jun. 8, 2016  (JP) .............................. JP2016-114480

(51) Int. Cl.
*G06K 9/00*    (2022.01)
*G06K 9/62*    (2022.01)
(Continued)

(52) U.S. Cl.
CPC ......... *G06V 40/172* (2022.01); *G06K 9/6215* (2013.01); *G06V 10/22* (2022.01); *G06V 10/273* (2022.01)

(58) Field of Classification Search
CPC ........... G06K 9/00268; G06K 9/00281; G06K 9/00288; G06K 9/00295; G06K 9/00302;
(Continued)

(56) References Cited

U.S. PATENT DOCUMENTS 7,719,569 B2 *   5/2010  Ohtake ................. H04N 5/232
                                                                              348/170
9,177,130 B2 *  11/2015  Nechyba .............. G06K 9/6217
(Continued)

FOREIGN PATENT DOCUMENTS

CN   103871174 A    6/2014
CN   104091156 A   10/2014
(Continued)

OTHER PUBLICATIONS

A. Khadatkar, R. Khedgaonkar and K. S. Patnaik, "Occlusion invariant face recognition system," 2016 World Conference on Futuristic Trends in Research and Innovation for Social Welfare (Startup Conclave), 2016, pp. 1-4, doi: 10.1109/STARTUP.2016.7583985. (Year: 2016).*
(Continued)

*Primary Examiner* — Claire X Wang
*Assistant Examiner* — Stephen M Brinich
(74) *Attorney, Agent, or Firm* — Greenblum & Bernstein, P.L.C.

(57) ABSTRACT

There are provided a comparison device and a comparison method including determining whether or not a comparison target person is a subject of a registered face image by comparing an imaged face image to the registered face image, determining whether or not a blocking object is
(Continued)

provided in the imaged face image, determining whether or not removing the blocking object is required, by calculating a partial similarity score between the imaged face image and the registered face image in a partial area corresponding to the blocking object, and urging the blocking object to be detached based on the partial similarity score.

10 Claims, 14 Drawing Sheets

(51) Int. Cl.
*G06V 40/16* (2022.01)
*G06V 10/22* (2022.01)
*G06V 10/26* (2022.01)

(58) Field of Classification Search
CPC ........... G06K 9/00308; G06K 9/00315; G06K 2009/00328; G06K 9/2054; G06K 9/346; G06K 9/6215
USPC ........ 382/181, 115–118, 190, 195, 155, 159, 382/165, 170
See application file for complete search history.

(56) References Cited

U.S. PATENT DOCUMENTS

| | | | |
|---|---|---|---|
| 2006/0165265 A1* | 7/2006 | Fujimatsu | G06K 9/00604 382/117 |
| 2010/0232657 A1* | 9/2010 | Wang | G06T 7/73 382/118 |
| 2010/0328442 A1* | 12/2010 | Yang | G06K 9/00261 348/77 |
| 2016/0275518 A1* | 9/2016 | Bowles | G07F 7/06 |
| 2017/0243053 A1* | 8/2017 | Li | G06K 9/00281 |

FOREIGN PATENT DOCUMENTS

| | | |
|---|---|---|
| JP | 2000-215316 A | 8/2000 |
| JP | 2000-251077 | 9/2000 |
| JP | 2005-071009 | 3/2005 |
| JP | 2008-097499 A | 4/2008 |
| JP | 2013-097760 | 5/2013 |
| WO | 2010/126120 | 11/2010 |

OTHER PUBLICATIONS

M. S. Ejaz and M. R. Islam, "Masked Face Recognition Using Convolutional Neural Network," 2019 International Conference on Sustainable Technologies for Industry 4.0 (STI), 2019, pp. 1-6, doi: 10.1109/STI47673.2019.9068044. (Year: 2019).*

S. A. Abushanap, A. M. Abdalla, A. A. Tamimi and S. Alzu'bi, "A Survey of Human Face Recognition for Partial Face View," 2021 International Conference on Information Technology (ICIT), 2021, pp. 571-576, doi: 10.1109/ICIT52682.2021.9491678. (Year: 2021).*

International Search Report issued in International Patent Application No. PCT/JP2017/019865, dated Aug. 22, 2017.

English Translation of Chinese Search Report dated Jul. 28, 2021 for the related Chinese Patent Application No. 201780033939.X.

* cited by examiner

FIG. 9

| BLOCKING OBJECT | EYEGLASSES | SUNGLASSES | FORELOCK | HAT | MASK |
|---|---|---|---|---|---|
| PARTIAL AREA HIDDEN BY BLOCKING OBJECT | RIGHT EYE AND LEFT EYE | RIGHT EYE AND LEFT EYE | FOREHEAD | FOREHEAD | NOSE AND MOUTH |

FIG. 14

| EYE-GLASSES DETECTION SCORE | EQUAL TO OR GREATER THAN THRESHOLD Th3 | | | | | | | | | SMALLER THAN THRESHOLD Th3 |
|---|---|---|---|---|---|---|---|---|---|---|
| | LOW | | | MIDDLE | | | HIGH | | | |
| SCORES OF LEFT EYE AND RIGHT EYE | LOW | MIDDLE | HIGH | LOW | MIDDLE | HIGH | LOW | MIDDLE | HIGH | |
| DEGREE OF HIGHLIGHTING 0 (LIGHT) TO 5 (DENSE) | 3 | 2 | 1 | 4 | 3 | 2 | 5 | 4 | 3 | 0 |

COMPARISON DEVICE AND COMPARISON METHOD

TECHNICAL FIELD

The disclosure relates to a comparison device and a comparison method for comparing an imaged face image to a registered face image.

BACKGROUND ART

For example, in a comparison device provided in an airport or the like, a person is verified by comparing a face image of the person, which is imaged by a camera, to a face image registered in a passport. In practice, this type of comparison device detects the feature value of a registered face image and the feature value of an imaged face image, calculates a score indicating similarity between the feature values, and authenticates whether or not the person is a registered person, based on the calculated score.

In a case where a comparison target person imaged by a camera puts a blocking object such as eyeglasses or a mask on, it is inconvenient that an authentication result that the comparison target person is not a registered person may be obtained even though the comparison target person is the registered person.

Here, PTL 1 discloses a technology of detecting that an imaged person puts a blocking object such as a mask on.

CITATION LIST

Patent Literature

PTL 1: Japanese Patent Unexamined Publication No. 2000-251077

SUMMARY OF THE INVENTION

Technical Problem

In the technology disclosed in PTL 1, simply, the blocking object is detected based on an imaged face image, and a financial transaction is canceled in a case where a blocking object is detected. This technology has not been achieved for comparison. That is, if the blocking object is detected from the imaged face image regardless of the registered face image, processing may be suspended.

In a case where the technology in PTL 1 is applied to a comparison device, if a comparison target person puts a blocking object such as eyeglasses or a mask on, comparison processing is immediately suspended. However, a comparison target person puts a blocking object such as eyeglasses or a mask on in many cases. Thus, it is very inconvenient to immediately suspend comparison processing in such a case.

An aspect of the disclosure provides a comparison device and a comparison method capable of properly urging a comparison target person to remove a blocking object.

Solutions to Problem

According to an aspect of the disclosure, a comparison device includes a processor and a storage unit.

The processor compares an imaged face image obtained by imaging the face of a comparison target person to a face image of the comparison target person, which has been registered in the storage unit.

As a result of the comparison, in a case where it is determined that the comparison target person as an imaged target in the imaged face image is not a subject of the registered face image, the processor presents information indicating that a blocking object is to be removed, to the comparison target person, based on a result obtained by determining whether or not the blocking object is provided in the imaged face image.

According to another aspect of the disclosure, a comparison method compares an imaged face image obtained by imaging a comparison target person to a registered face image.

The comparison method compares the imaged face image to the registered face image.

As a result of the comparison, in a case where it is determined that the comparison target person as an imaged target in the imaged face image is not a subject of the registered face image, information indicating that a blocking object is to be removed is presented to the comparison target person. based on a result obtained by determining whether or not the blocking object is provided in the imaged face image.

Advantageous Effects of Invention

According to an aspect of the disclosure, it is possible to properly urge the comparison target person to remove the blocking object.

More advantages and effects in the aspect of the disclosure are clearly described in the specification and the drawings. The advantages and/or the effects are provided by any exemplary embodiment and features described in the specification and the drawings, respectively. However, all are not necessarily provided for obtaining one or more of the same features.

BRIEF DESCRIPTION OF DRAWINGS

FIG. 9 is a diagram illustrating an example of a correspondence relation between a blocking object and a partial area hidden by the blocking object.

FIG. 14 is a diagram illustrating an example of the degree of highlighting based on the blocking object score and the partial score.

DESCRIPTION OF EMBODIMENT

Hereinafter, an exemplary embodiment of the disclosure will be described in detail with reference to the drawings.

Figure 1:
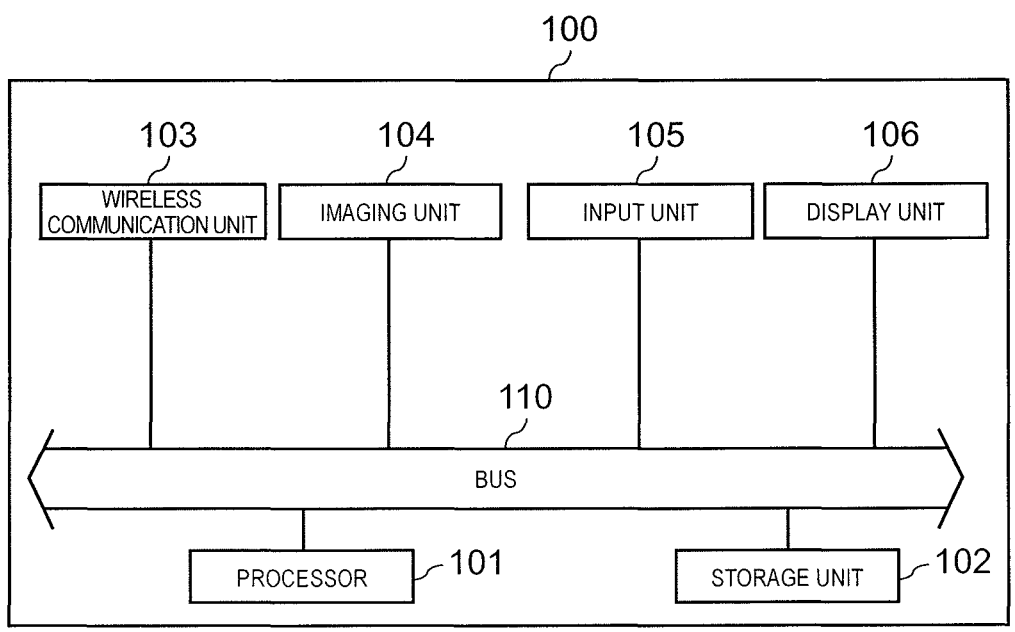
FIG. 1 is a block diagram illustrating an overall configuration of a comparison device according to an exemplary embodiment.

FIG. 1 is a block diagram illustrating an overall configuration of a comparison device according to an exemplary embodiment. Comparison device 100 is applied to a gate opening and closing system of an airport, for example. In the gate opening and closing system, comparison device 100 compares whether a comparison target person attempting to pass through a gate is a subject registered in a passport. In a case of being authenticated to be a subject, a gate is opened. In a case of being not authenticated, the gate is closed.

In comparison device 100, processor 101, storage unit 102, wireless communication unit 103, imaging unit 104, input unit 105, and display unit 106 are connected to each other through bus 110.

A registered image is stored in storage unit 102. The registered image is stored in storage unit 102 through input unit 105. Input unit 105 is, for example, a scanner, and reads a face image to be registered in a passport.

Imaging unit 104 includes a camera, and images a face image of a comparison target person in front of the gate.

The face image of a comparison target person, which has been imaged by imaging unit 104 and a face image of the comparison target person before imaging are displayed in display unit 106. An instruction regarding imaging is displayed in display unit 106. The instruction regarding imaging includes a display of urging the comparison target person to remove a blocking object. The instruction regarding imaging will be described later in detail.

Wireless communication unit 103 wirelessly receives a detection result of a human body sensor in the gate opening and closing system. Comparison device 100 controls a display timing for display unit 106 and an imaging timing of imaging unit 104, and the like based on the detection result of the human body sensor. If it is authenticated that the comparison target person is a registered subject by comparison device 100, wireless communication unit 103 wirelessly transmits a message indicating this to a gate opening and closing control unit. Thus, the gate is controlled to be opened.

Processor 101 performs the overall processing of comparison device 100, which includes face authentication processing by comparison device 100 and display processing for display unit 106.

Figure 2:
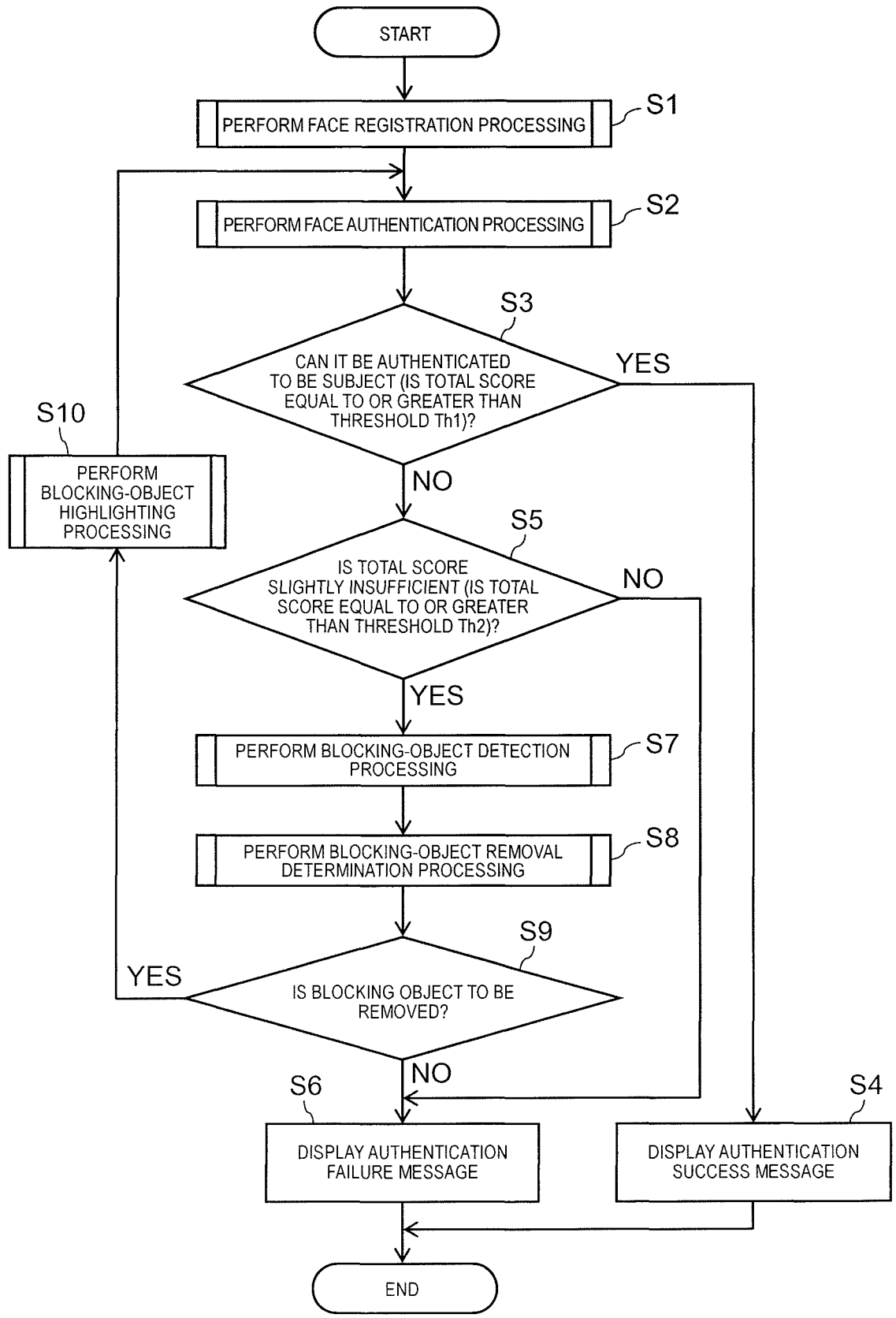
FIG. 2 is a flowchart illustrating comparison processing.

FIG. 2 is a flowchart illustrating comparison processing performed by comparison device 100.

If the comparison device starts the comparison processing, comparison device 100 performs face registration processing in Step S1 and performs face authentication processing in Step S2. The face registration processing in Step S1 is performed by inputting, for example, a face image of a passport through input unit 105 and storing the face image in storage unit 102. The face authentication processing in Step S2 is performed by processor 101 in a manner that the processor calculates a score indicating similarity between the face image imaged by imaging unit 104 and the face image registered in storage unit 102 in Step S1 and performs determination between the score and a threshold.

In Step S3, if the total score is equal to or greater than threshold Th1, processor 101 determines that the comparison target person is a subject (YES in Step S3). If processor 101 determines that the comparison target person is the subject in Step S3, the process proceeds to Step S4. In Step S4, processor 101 displays an authentication success message (that is, indicating that a person of the imaged face image is the same as a person of the registered face image) in display unit 106. However, if the total score is smaller than threshold Th1 in Step S3 (NO in Step S3), processor 101 causes the process to proceed to Step S5.

In Step S5, processor 101 determines whether or not the total score is equal to or greater than threshold Th2. Here, threshold Th2 is smaller than threshold Th1, that is, Th2<Th1 is satisfied. In a case where the processor determines that the total score is smaller than threshold Th2 (NO in Step S5), processor 101 causes the process to proceed to Step S6 from Step S5, and displays an authentication failure message (that is, indicating that the person of the imaged face image is different from the person of the registered face image) in display unit 106. However, if the total score is equal to or greater than threshold Th2, processor 101 determines that there is a possibility of the person being the subject, and causes the process to proceed to Step S7 without immediately displaying the authentication failure message. That is, in a case of Th2≤total score<Th1 (case where, the total score does not reach Th1 slightly), the processor does not immediately determine that the authentication has failed. The reason is that, in a case where, the total score does not reach Th1 slightly, there is a possibility of the score decreasing in spite of being the subject, due to any cause, for example, a blocking object being provided.

Processor 101 performs blocking-object detection processing in Step S7, so as to calculate the probability of whether or not the comparison target person wears a blocking object. Processor 101 performs blocking-object taking-off determination processing in Step S8, so as to determine whether or not a message indicating that the blocking object put on is to be removed is presented to the comparison target person. In Step S9, processor 101 determines whether or not the blocking object is to be removed, based on a determination result of the blocking-object taking-off determination processing in Step S8. In a case where the processor determines that the blocking object is to be removed in Step S9, processor 101 causes the process to proceed to Step S10. Then, the processor performs blocking-object highlighting processing so as to urge the comparison target person to remove the blocking object. On the contrary, in a case where it is not determined that the blocking object is to be removed in Step S9, the processor causes the process to proceed to Step S6 and displays an authentication failure message in display unit 106.

Figure 3:
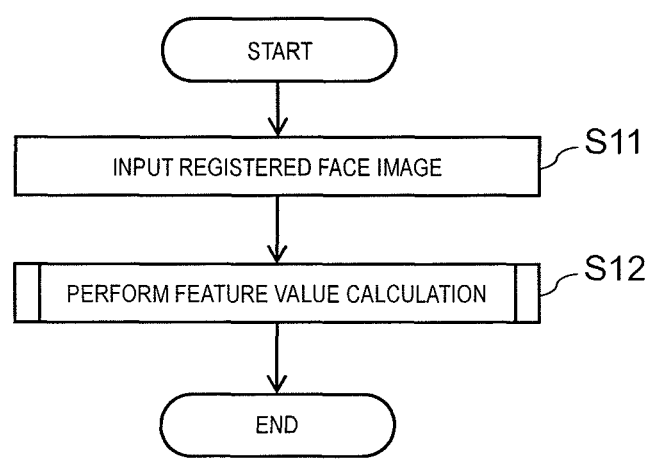
FIG. 3 is a flowchart illustrating face registration processing.

FIG. 3 is a flowchart illustrating processing details of the face registration processing performed in Step S1 in FIG. 2. As illustrated in FIG. 3, in the face registration processing (Step S1), comparison device 100 inputs a face image desired to be registered, through input unit 105 in Step S11. The comparison device stores the face image to be registered in storage unit 102. In Step S12, processor 101 calculates the feature value of the registered face image.

Figure 4:
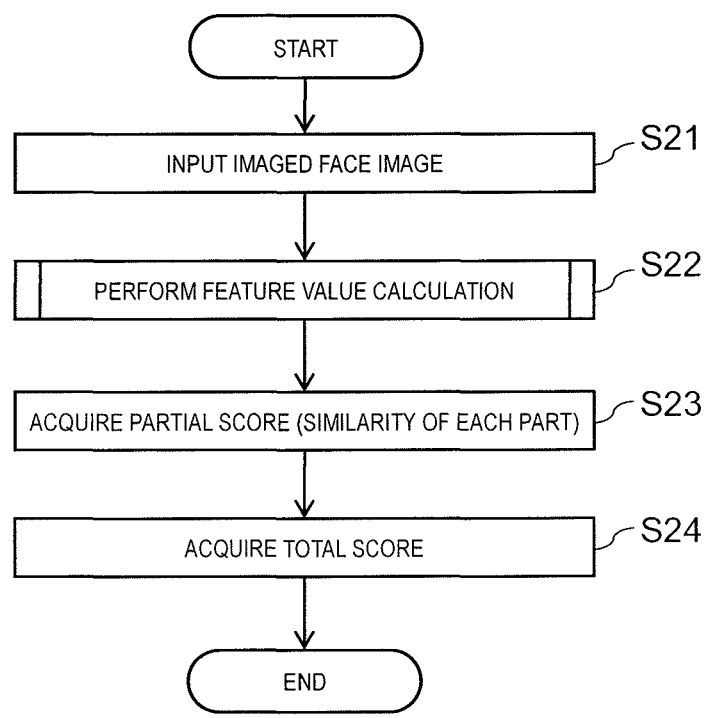
FIG. 4 is a flowchart illustrating face authentication processing.

FIG. 4 is a flowchart illustrating processing details of the face authentication processing performed in Step S2 in FIG. 2. As illustrated in FIG. 4, in the face authentication processing (Step S2), in comparison device 100, firstly, an imaged face image imaged by imaging unit 104 is input in Step S21. In Step S22, processor 101 calculates the feature value of the imaged face image. The feature value is a feature value of the same type of that of the feature value used in Step S12. In Step S23, processor 101 acquires a partial score (similarity of each part) through calculation. Specifically, the processor calculates similarity (=partial score) of each partial area by using normalized correlation or the like, based on the feature value of a partial area of the registered face image and the feature value of the partial area of the imaged face image. For example, as an example of similarity of each partial area, similarity Sreye (=partial score of right eye) of the right eye can be obtained by normalized correlation of the following expression, when the feature value of the right eye obtained from the registered face image is set as $Dreye_{regist}$, and the feature value of the right eye obtained from the imaged face image is set as $Dreye_{verify}$.

$$Sreye = \frac{Dreye_{regist}^T \cdot Dreye_{verify}}{\|Dreye_{regist}\|\|Dreye_{verify}\|}$$ [Expression 1]

In Step S24, processor 101 acquires the total score through calculation by using the partial score. For example, the total score can be obtained by an average of partial scores of the forehead, the right eye, the left eye, the nose, and the mouth or by summation of the partial scores. For example, when the partial area is set as P, and similarity of a partial area p is set as $S_p$, the total score $S_{all}$ can be obtained by the average as with the following expression.

$$S_{all} = \frac{1}{P}\sum_{p=0}^{P} S_p$$ [Expression 2]

Figure 5:
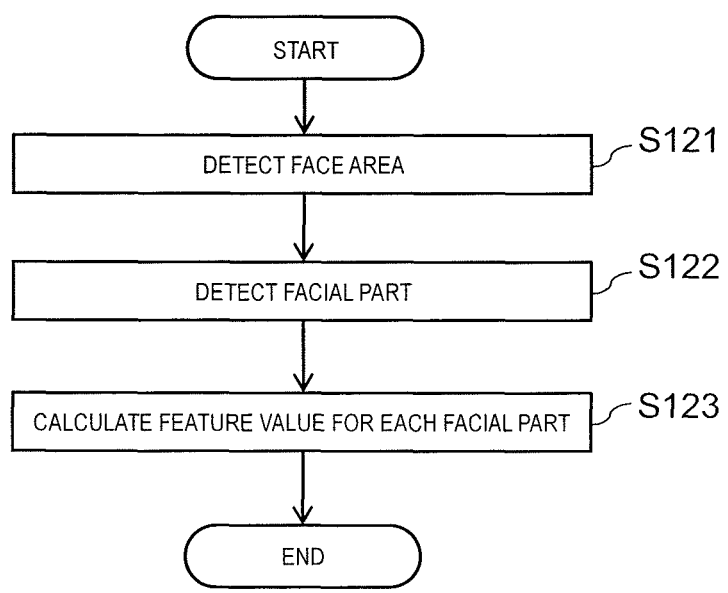
FIG. 5 is a flowchart illustrating feature value calculation processing.
Figure 6:
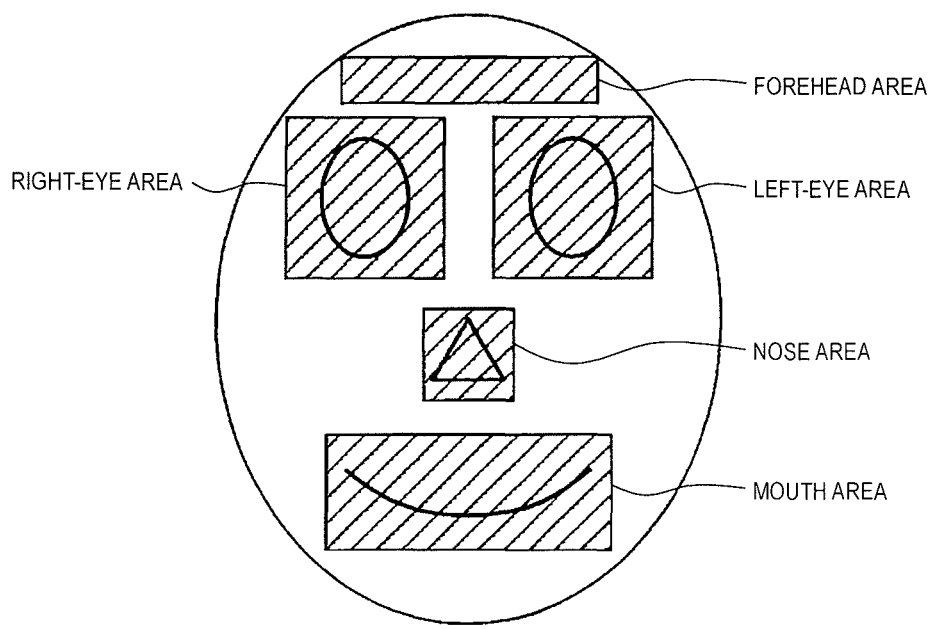
FIG. 6 is a diagram for describing a facial part (partial area).
Figure 7:
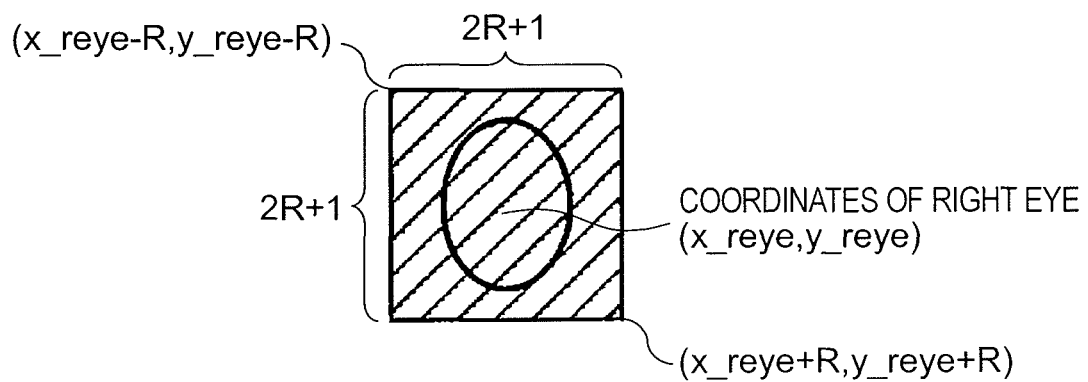
FIG. 7 is a diagram for describing the facial part (partial area).

FIG. 5 is a flowchart illustrating processing details of feature value calculation processing performed in Step S12 in FIG. 3 and Step S22 in FIG. 4. In the feature value calculation processing, in Step S121, processor 101 detects a face area from an image. At this time, the processor can detect the face area, for example, by using Haar-like features and a learning algorithm by boosting. In Step S122, the processor detects a partial area from the face area detected in Step S121. As an example of a method of detecting the partial area from the face area, the known method can be used. In the exemplary embodiment, the processor detects the partial area from the face area by using Random-Forest regression. The method of detecting a partial area from the face area is not limited to Random-Forest regression, and other regression methods, machine learning, or the like may be used. As illustrated in FIG. 6, the partial area is a component constituting the face, such as a left-eye area, a right-eye area, a nose area, a mouth area, and a forehead area. As illustrated in FIG. 7, for example, Ile right-eye area is a rectangular area of a radius R which is based on the coordinates of the right eye as the center, when the coordinates of the right eye are set to be (xreye, yreye). In Step S123, the processor calculates the feature value of each partial area. An example of the method of calculating the feature value will be described. For example, the processor selects any N points in the right-eye area. The number N of points satisfies $N \geq 1$ and $N \leq 4R^2+4R+1$. The processor extracts a SIFT feature value in 128 dimensions from the points and sets the extracted feature value to be the feature value Dreye of the right-eye area. Thus, the number of dimensions of the features Dreye in the right-eye area is N×128.

Figure 8:
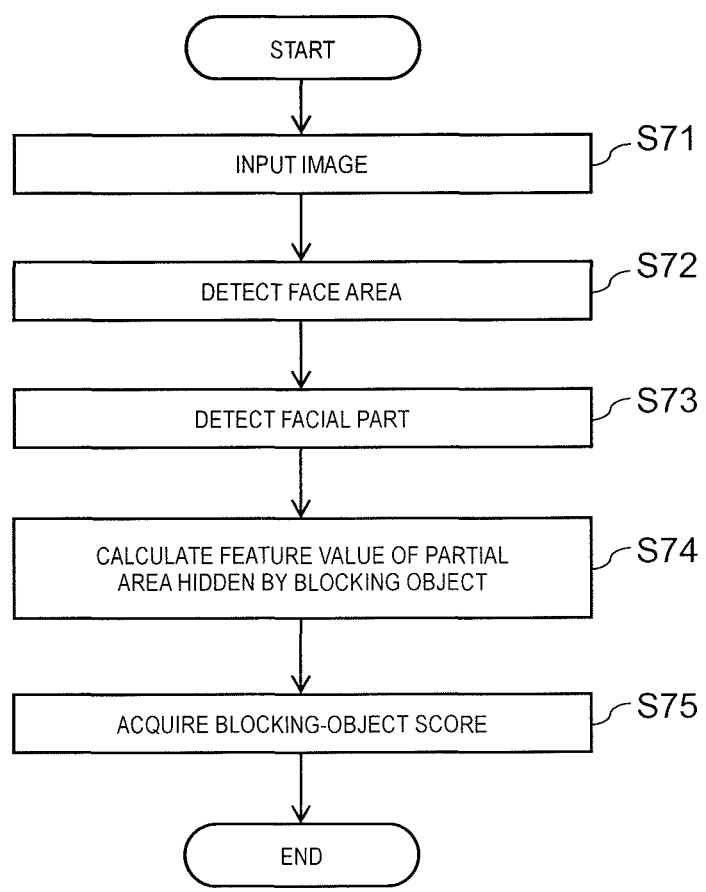
FIG. 8 is a flowchart illustrating blocking-object detection processing.

FIG. 8 is a flowchart illustrating processing details of blocking-object detection processing performed in Step S7 in FIG. 2. As illustrated in FIG. 8, in the blocking-object detection processing (Step S7), in comparison device 100, firstly, an imaged face image imaged by imaging unit 104 is input in Step S71. In Step S72, processor 101 detects a face area from the imaged face image. In Step S73, processor 101 detects a partial area. In Step S74, processor 101 calculates the feature value of a partial area having a possibility of being hidden by a blocking object, for each blocking object. Examples of the feature value herein include Haar-like features. FIG. 9 is a diagram illustrating an example of a correspondence relation between a blocking object and a partial area hidden by the blocking object. As illustrated in FIG. 9, an average of the feature value of the right-eye area and the feature value of the left-eye area may be obtained in order to calculate the feature value of a partial area having a possibility of being hidden by eyeglasses, for example. In Step S75, processor 101 acquires a blocking object score through calculation by using the feature value obtained in Step S74. The blocking object score is a probability of a specific blocking object being provided in the face image. The blocking object score is defined for each type of blocking object. The blocking object score is obtained in a manner that the feature value of each blocking object, which has been obtained in Step S74 is input to a support vector machine (SVM) in which learning regarding whether or not the blocking object is provided has been performed. That is, processor 101 has a function of the SVM. As a blocking object score for a specific blocking object increases, a possibility of the comparison target person putting the blocking object on increases. For example, if a blocking object score for eyeglasses is high, the possibility of the comparison target person putting eyeglasses on is high. If a blocking object score for sunglasses is high, the possibility of the comparison target person putting sunglasses on is high.

Figure 10:
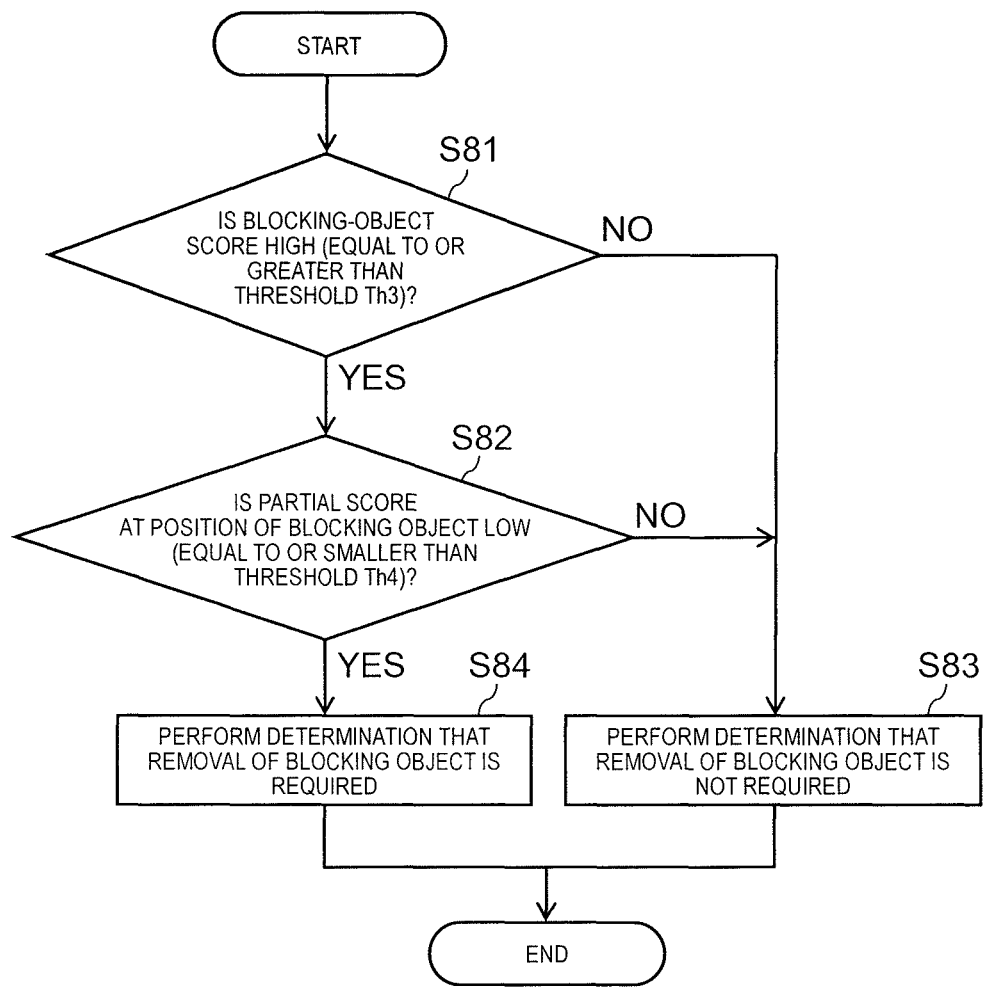
FIG. 10 is a flowchart illustrating blocking-object taking-off determination processing.

FIG. 10 is a flowchart illustrating processing details of blocking-object taking-off determination processing performed in Step S8 in FIG. 2. As illustrated in FIG. 10, in the blocking-object taking-off determination processing (Step S8), in Step S81, processor 101 determines whether or not the blocking object score obtained in Step S75 is equal to or greater than a predetermined threshold Th3. In a case where it is determined that the blocking object score is smaller than the predetermined threshold Th3 (NO in Step S81), this case means that the possibility of the blocking object being provided is low. Thus, the process proceeds to Step S83. The processor determines that presenting a message indicating removal of the blocking object is not required. On the contrary, in a case where it is determined that the blocking object score is equal to or greater than the predetermined threshold Th3 (YES in Step S81), this case means that the possibility of the blocking object being provided is high. Thus, the process proceeds to Step S82.

In Step S82, the processor determines whether or not a partial score at the position of the blocking object is equal to or smaller than a predetermined threshold Th4. Specifically, the processor calculates a partial score of a partial area hidden by the blocking object. The processor performs the calculation by using the feature value of a partial area (FIG. 9) hidden by the blocking object in the registered face image and the feature value of a partial area at the position of the blocking object in the imaged face image. The processor compares the partial score to the threshold Th4. For example, the partial score of a partial area hidden by eyeglasses is an average of the partial score of the right-eye area and the partial score of the left-eye area. The situation that the partial score at the position of the blocking object is equal to or smaller than the predetermined threshold Th4 means that the partial score is largely decreased by the blocking object. (1) The situation that the partial score at the position of the blocking object is low means that the registered face image is not similar to the imaged face image in this partial area. (2) In Step S74, it is confirmed that a possibility of the blocking object being provided in the partial area is high. According to the situation shown in (1) and (2), it is inferred that the registered face image and the imaged face image in this partial area are not similar to each other by an influence of the blocking object.

As described above, in the exemplary embodiment, when the blocking object score is equal to or greater than the threshold Th3, and it is determined that the blocking object is detected, it is not immediately determined that removal of the blocking object is required. Instead, only when the partial score is largely decreased by the blocking object, it is determined that removal of the blocking object is required. Thus, it is possible to avoid unnecessary urging of the comparison target person to remove the blocking object, and wasteful annoyance is not applied to the comparison target person. Examples of a situation other than the situation in which the partial score is largely decreased by the blocking object include a situation in which similarity of the imaged face image to the registered face image is high even though the comparison target person in the imaged face image wears the blocking object. In the situation other than the situation in which the partial score is largely decreased by the blocking object, if the comparison target person is urged to remove the blocking object, the accuracy of comparison may rather decrease.

Figure 11A:
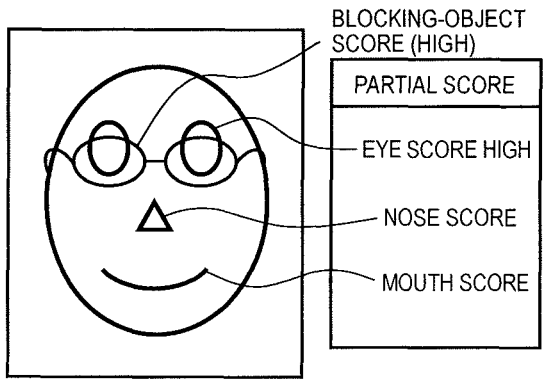
FIG. 11A is a diagram illustrating an example in which a blocking object score is high, and a partial score is high.
Figure 11B:
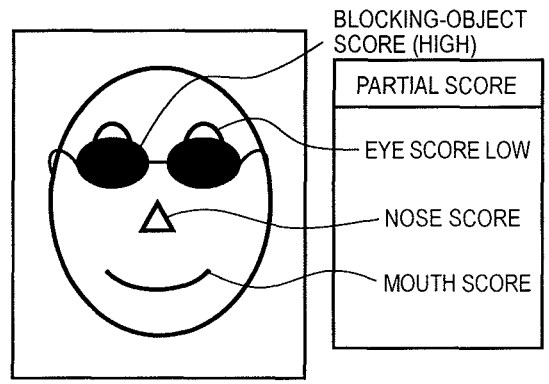
FIG. 11B is a diagram illustrating an example in which the blocking object score is high, but the partial score is low.

FIGS. 11A and 11B illustrate examples of the blocking object score and the partial score in the exemplary embodiment. FIG. 11A illustrates an example in which the blocking object score is high, and the partial score is high. FIG. 11B illustrates an example in which the blocking object score is high, but the partial score is low. In FIG. 11A, the comparison target person wears eyeglasses. Since the eyeglasses are detected, the blocking object score is high. In addition, since an area in which the face image is hidden by the eyeglasses is small, the partial score is high without an occurrence of a situation in which the partial score is largely decreased by the eyeglasses. In FIG. 11B, the comparison target person wears sunglasses. Since the sunglasses are detected, the blocking object score is high. In addition, since an area in which the face image is hidden by the sunglasses is large, the partial score is largely decreased by the sunglasses, and thus the partial score becomes small.

If it is determined whether or not removal of the blocking object is required in the exemplary embodiment, processing as follows may be performed. In a case as in FIG. 11A, an influence on the comparison is small, and thus, the comparison target person removing the eyeglasses is not required. In a case as in FIG. 11B, the influence on the comparison is large, and thus the comparison target person removing the sunglasses is required.

Examples of determination processing in a case where the blocking object is eyeglasses will be described below.

Case 1: an eyeglass detection score is equal to or greater than Th3, and the partial score of a partial area hidden by eyeglasses is equal to or greater than Th4→the eyeglasses are provided, but an influence thereof is small, and thus the score of the eyes is high. Thus, the eyeglasses are not required to be taken off.

Case 2: the eyeglass detection score is equal to or greater than Th3, and the partial score of the partial area hidden by the eyeglasses is equal to or smaller than Th4→since the eyeglasses are provided, an influence thereof is large, and thus the score of the eyes is low. Thus, the eyeglasses are required to be taken off.

Case 3: the eyeglass detection score is equal to or smaller than Th3, and the partial score of the partial area hidden by the eyeglasses is equal to or greater than Th4→the eyeglasses are not provided, and the score of the eyes is high. Thus, the eyeglasses are not required to be taken off.

Case 4: the eyeglass detection score is equal to or smaller than Th3, and the partial score of the partial area hidden by the eyeglasses is equal to or smaller than Th4→the eyeglasses are not provided, and the score of the eyes is low. Thus, the eyeglasses are not required to be taken off.

Figure 12:
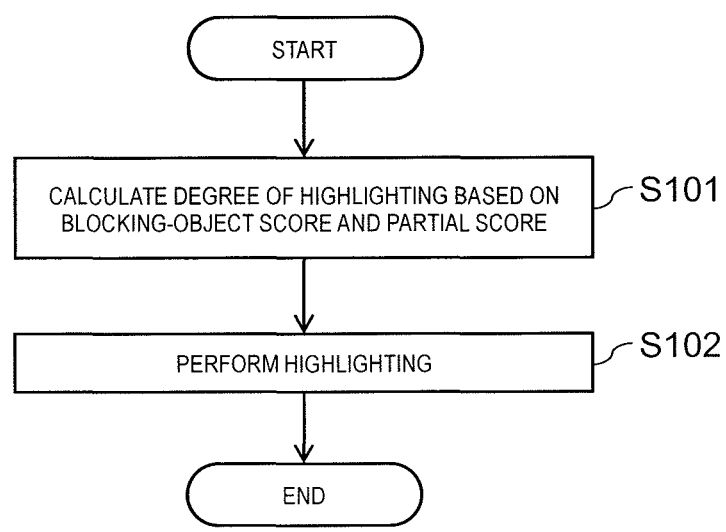
FIG. 12 is a flowchart illustrating blocking-object highlighting processing.

FIG. 12 is a flowchart illustrating processing details of blocking-object highlighting processing performed in Step S10 in FIG. 2. As illustrated in FIG. 12, in the blocking-object highlighting processing (Step S10), in Step S101, processor 101 calculates the degree of highlighting based on the blocking object score and the partial score.

Figure 13:
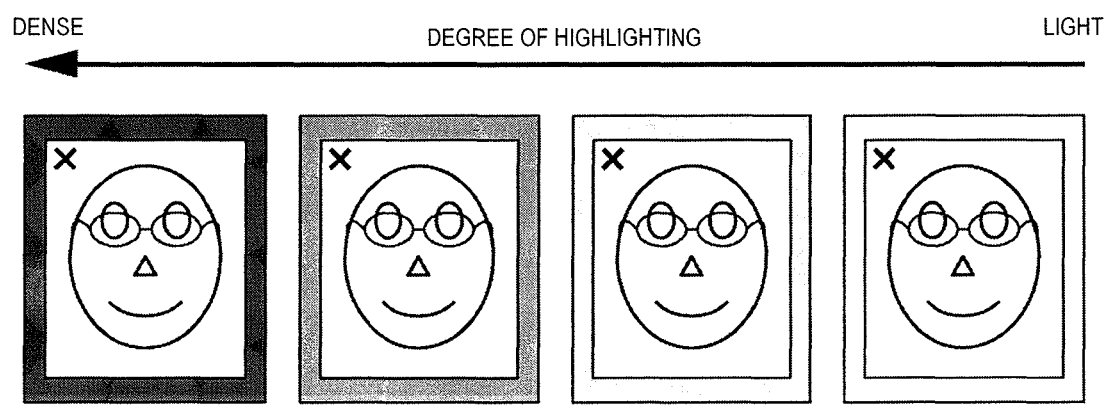
FIG. 13 is a diagram for describing highlighting.

The highlighting means a display for urging the comparison target person to remove the blocking object. For example, as illustrated in FIG. 13, if an "x" mark is displayed along with a template image having eyeglasses, the comparison target person can be urged to remove the eyeglasses. At this time, it is possible to perform highlighting stronger in a manner that the image is surrounded by a border line, and the thickness of the border line becomes thicker or the color of the border line becomes more prominent. A method of the highlighting is not limited thereto. For example, the degree of an emphasis may change in accordance with a display size.

FIG. 14 illustrates an example of the degree of highlighting based on the blocking object score and the partial score. As the eyeglass detection score (blocking object score regarding eyeglasses) increases in FIG. 14, and the score of the left eye and the right eye (partial score of a partial area hidden by the eyeglasses) in FIG. 14 decreases, the degree of highlighting becomes higher.

In Step S102, processor 101 displays an image of the degree of the emphasis, which has been calculated in Step S101, in display unit 106. Thus, it is possible to properly urge the comparison target person to remove the blocking object.

As described above, according to the exemplary embodiment, in a case where a comparison target person as an imaged target in an imaged face image is not a subject of a registered face image, information indicating that a blocking object is to be removed is presented to the comparison target person, based on a result obtained by determining whether or not the blocking object is provided in the imaged face image.

According to the exemplary embodiment, steps as follows are provided: an authentication step (Step S3) of determining whether or not a comparison target person is a subject of a registered face image by comparing an imaged face image to the registered face image; a blocking-object detection step (Step S75) of determining whether or not a blocking object is provided in the imaged face image; a partial-score calculation step (Step S82) of calculating a partial similarity score between the imaged face image and the registered face image in a partial area corresponding to the blocking object; and an urging step (Step S10) of urging the blocking object to be detached based on the partial similarity score calculated in the partial-score calculation step (Step S82).

Thus, it is possible to precisely detect that a comparison target person puts a blocking object serving as an obstacle of the comparison processing on, and to properly urge the comparison target person to remove the blocking object.

According to the exemplary embodiment, a comparison target person is not immediately urged to remove a blocking object when the blocking object is detected, but is urged to remove the blocking object only when the partial score is largely decreased by the blocking object. Thus, it is possible to avoid urging of the comparison target person to remove the blocking object, and wasteful annoyance is not applied to the comparison target person.

Hitherto, various exemplary embodiments are described with reference to the drawings. However, the disclosure is not limited to the above-described example. According to those skilled in the related art, it is obvious that various alternations or modifications may be conceived within the scope described in the claims, and it is appreciated that the alternations or modifications belong to the technical scope of the disclosure as well. The components in the exemplary embodiment may be randomly combined in a range without departing from the gist of the disclosure.

In the above-described exemplary embodiment, a case where the comparison device and the comparison method in the disclosure are applied to a gate opening and closing system is described. However, the comparison device and the comparison method in the disclosure may also be applied to systems other than the gate opening and closing system. Of course, the registered face image is not limited to an image in a passport.

In the above-described exemplary embodiment, a case where the comparison target person is urged to remove a blocking object by displaying is described. However, it is not limited thereto, and the urging may be performed by presenting with sound or light, for example.

<Summarization>

According to the disclosure, a comparison device includes a processor and a storage unit. The processor compares an imaged face image obtained by imaging a face of a comparison target person to a face image of the comparison target person, which has been registered in the storage unit. In a case where it is determined that the comparison target person as an imaged target in the imaged face image is not a subject of the registered face image, as a result of the comparison, the processor presents information indicating that a blocking object is to be removed, to the comparison target person, based on a result obtained by determining whether or not the blocking object is provided in the imaged face image.

In the comparison device according to the disclosure, the information indicating that the blocking object is to be removed is presented to the comparison target person in a case where a similarity score is equal to or smaller than first threshold Th1 and equal to or greater than second threshold Th2, as a result of the comparison. Thus, it is possible to present the information indicating that the blocking object is to be removed, only in a case where, the total score does not reach threshold Th1 slightly. In addition, wasteful annoyance is not applied to the comparison target person.

In the comparison device according to the disclosure, the processor further calculates a partial similarity score between the imaged face image and the registered face image in a partial area corresponding to the blocking object, and presents the information indicating that the blocking object is to be removed, to the comparison target person based on the partial similarity score and the result obtained by determining whether or not the blocking object is provided. Thus, it is possible to present the information indicating that the blocking object is to be removed, only in a case where the partial similarity score between the imaged image and the registered image is low and the determination result that the blocking object is provided is obtained. Accordingly, it is possible to more precisely detect the presence of the blocking object serving as an obstacle of the comparison processing and more properly urge the comparison target person to remove the blocking object.

In the comparison device according to the disclosure, strength in presentation of the information indicating that the blocking object is to be removed is changed based on the partial similarity score. Thus, it is possible to more increase strength in presentation of the information indicating that the blocking object is to be removed, as the partial similarity score becomes much lower (that is, as the possibility of the blocking object being provided becomes much higher). Accordingly, it is possible to strongly urge the comparison target person to remove the blocking object as the possibility of the blocking object being provided becomes much higher.

In the comparison device according to the disclosure, in a case where it is determined that the blocking object is provided in the imaged face image, the information indicating that the blocking object is to be removed is presented to the comparison target person by highlighting a template image having the blocking object. Thus, the comparison target person can easily recognize a blocking object to be removed.

In the comparison device according to the disclosure, the degree of the highlighting is changed based on a partial similarity score between the imaged face image and the registered face image in a partial area corresponding to the blocking object. Thus, it is possible to more increase strength in presentation of the information indicating that the blocking object is to be removed, as the partial similarity score becomes much lower (that is, as the possibility of the blocking object being provided becomes much higher). Accordingly, it is possible to strongly urge the comparison target person to remove the blocking object as the possibility of the blocking object being provided becomes much higher.

According to the disclosure, a comparison method compares an imaged face image obtained by imaging a comparison target person to a registered face image. The comparison method compares the imaged face image to the registered face image, and, in a case where it is determined that the comparison target person as an imaging target of the imaged face image is not a subject of the registered face image, as a result of the comparison, presents information indicating that a blocking object is to be removed, to the comparison target person, based on a result obtained by determining whether or not the blocking object is provided in the imaged face image.

INDUSTRIAL APPLICABILITY

The disclosure is suitable for a comparison device and a comparison method of comparing an imaged face image to a registered face image.

REFERENCE MARKS IN THE DRAWINGS

100 COMPARISON DEVICE
101 PROCESSOR
102 STORAGE UNIT
103 WIRELESS COMMUNICATION UNIT
104 IMAGING UNIT
105 INPUT UNIT
106 DISPLAY UNIT

The invention claimed is:

1. A comparison device comprising:
   a processor; and
   a storage,
   wherein the processor compares an imaged face image obtained by imaging a face of a comparison target person to a face image of the comparison target person, which has been registered in the storage, and
   in a case where it is determined that the comparison target person as an imaged target in the imaged face image is not a subject of the registered face image, as a result of the comparison, the processor presents information indicating that a blocking object is to be removed, to the comparison target person, based on a result obtained by determining whether or not the blocking object is provided in the imaged face image,
   wherein the processor further
      calculates a partial similarity score between the imaged face image and the registered face image in a partial area corresponding to the blocking object, and
      presents the information indicating that the blocking object is to be removed, to the comparison target person based on the partial similarity score and the result obtained by determining whether or not the blocking object is provided.

2. The comparison device of claim 1,
   wherein strength in presentation of the information indicating that the blocking object is to be removed is changed based on the partial similarity score.

3. The comparison device of claim 1,
   wherein, in a case where it is determined that the blocking object is provided in the imaged face image, the information indicating that the blocking object is to be removed is presented to the comparison target person by highlighting a template image having the blocking object.

4. The comparison device of claim 3,
   wherein a degree of the highlighting is changed based on the partial similarity score between the imaged face image and the registered face image in the partial area corresponding to the blocking object.

5. The comparison device of claim 1, wherein,
   in a case where a similarity score is larger than a first threshold Th1, the processor determines that the comparison target person is the subject of the registered face image,
   in a case where the similarity score is equal to or smaller than the first threshold Th1 and equal to or greater than a second threshold Th2, the processor determines that the comparison target person is not the subject of the registered face image, and determines whether or not to present the information indicating that the blocking object is to be removed to the comparison target person based on the result obtained by determining whether or not the blocking object is provided in the imaged face image, and
   in a case where the similarity score is smaller than the second threshold Th2, the processor determines that the comparison target person is not the subject of the registered face image, and determines not to present the information indicating that the blocking object is to be removed to the comparison target person.

6. A comparison method of comparing an imaged face image obtained by imaging a comparison target person to a registered face image, the method comprising:
   comparing the imaged face image to the registered face image;
   in a case where it is determined that the comparison target person as an imaging target of the imaged face image is not a subject of the registered face image, as a result of the comparison, presenting information indicating that a blocking object is to be removed, to the comparison target person, based on a result obtained by determining whether or not the blocking object is provided in the imaged face image;
   calculating a partial similarity score between the imaged face image and the registered face image in a partial area corresponding to the blocking object; and
   presenting the information indicating that the blocking object is to be removed, to the comparison target person based on the partial similarity score and the result obtained by determining whether or not the blocking object is provided.

7. The comparison method of claim 6,
   wherein strength of urging is changed in accordance with the partial similarity score between the imaged face image and the registered face image.

8. The comparison method of claim 6,
   wherein, in a case where it is determined that the blocking object is provided in the imaged face image, the information indicating that the blocking object is to be removed is presented to the comparison target person by highlighting a template image having the blocking object.

9. The comparison method of claim 8,
   wherein a degree of the highlighting is changed based on the partial similarity score between the imaged face image and the registered face image in the partial area corresponding to the blocking object.

10. The comparison method of claim 6, wherein,
    in a case where a similarity score is larger than a first threshold Thi, it is determined that the comparison target person is the subject of the registered face image,
    in a case where the similarity score is equal to or smaller than the first threshold Th1 and equal to or greater than a second threshold Th2, it is determined that the comparison target person is not the subject of the registered face image, and it is determined whether or not to present the information indicating that the blocking object is to be removed to the comparison target person based on the result obtained by determining whether or not the blocking object is provided in the imaged face image, and
    in a case where the similarity score is smaller than the second threshold Th2, it is determined that the comparison target person is not the subject of the registered face image, and it is determined not to present the information indicating that the blocking object is to be removed to the comparison target person.

* * * * *